United States Patent [19]

Gallois-Montbrun

[11] Patent Number: 5,022,929
[45] Date of Patent: Jun. 11, 1991

[54] SOLAR COLLECTOR

[76] Inventor: Roger Gallois-Montbrun, 11 bis, rue de Navarre, 75005 Paris, France

[21] Appl. No.: 483,190

[22] Filed: Feb. 22, 1990

[30] Foreign Application Priority Data

Feb. 23, 1989 [FR] France .............................. 89 02329

[51] Int. Cl.$^5$ .......................................... H01L 31/045
[52] U.S. Cl. .................................... 136/246; 136/245
[58] Field of Search .............................. 136/246, 245; 126/424–425

[56] References Cited

U.S. PATENT DOCUMENTS

| | | | |
|---|---|---|---|
| 4,091,799 | 5/1978 | Steiner | 126/425 |
| 4,129,360 | 12/1978 | Deflandre et al. | 350/613 |
| 4,172,739 | 10/1979 | Tassen | 136/246 |
| 4,284,839 | 8/1981 | Johnson | 136/246 |
| 4,316,448 | 2/1982 | Dodge | 126/424 |
| 4,771,764 | 9/1988 | Cluff | 126/440 |

FOREIGN PATENT DOCUMENTS 2544551 10/1984 France .............................. 136/246

Primary Examiner—Aaron Weisstuch
Attorney, Agent, or Firm—Sughrue, Mion, Zinn, Macpeak & Seas

[57] ABSTRACT

The improved solar collector of the present invention is constituted by a roof-shaped structure (1) serving as a support for a front and rear panels (2, 3), in the form of elongated rectangles having the same dimensions as the faces of the said structure (1), on which various solar energy collecting means are mounted, and whose top longitudinal edges are hinged to a common rotation axis coinciding with the ridge line of the structure (1).

Combined with a support, this roof-shaped structure (1) forms an assembly which, by means of appropriate mechanisms, can move about a vertical rotation axis.

The solar collector is also provided with two different orientation systems:

the first system, operating in azimuth, enables the moving assembly to rotate about its vertical axis, with its plane solar collectors facing the sun.

the second system, operating in elevation, enables the front and back panels (2, 3) to rotate about their common horizontal axis and keep the same inclinations, normal to the sun's rays. This second orientation system constitutes the main improvement brought by the present invention to this solar collector device.

5 Claims, 6 Drawing Sheets

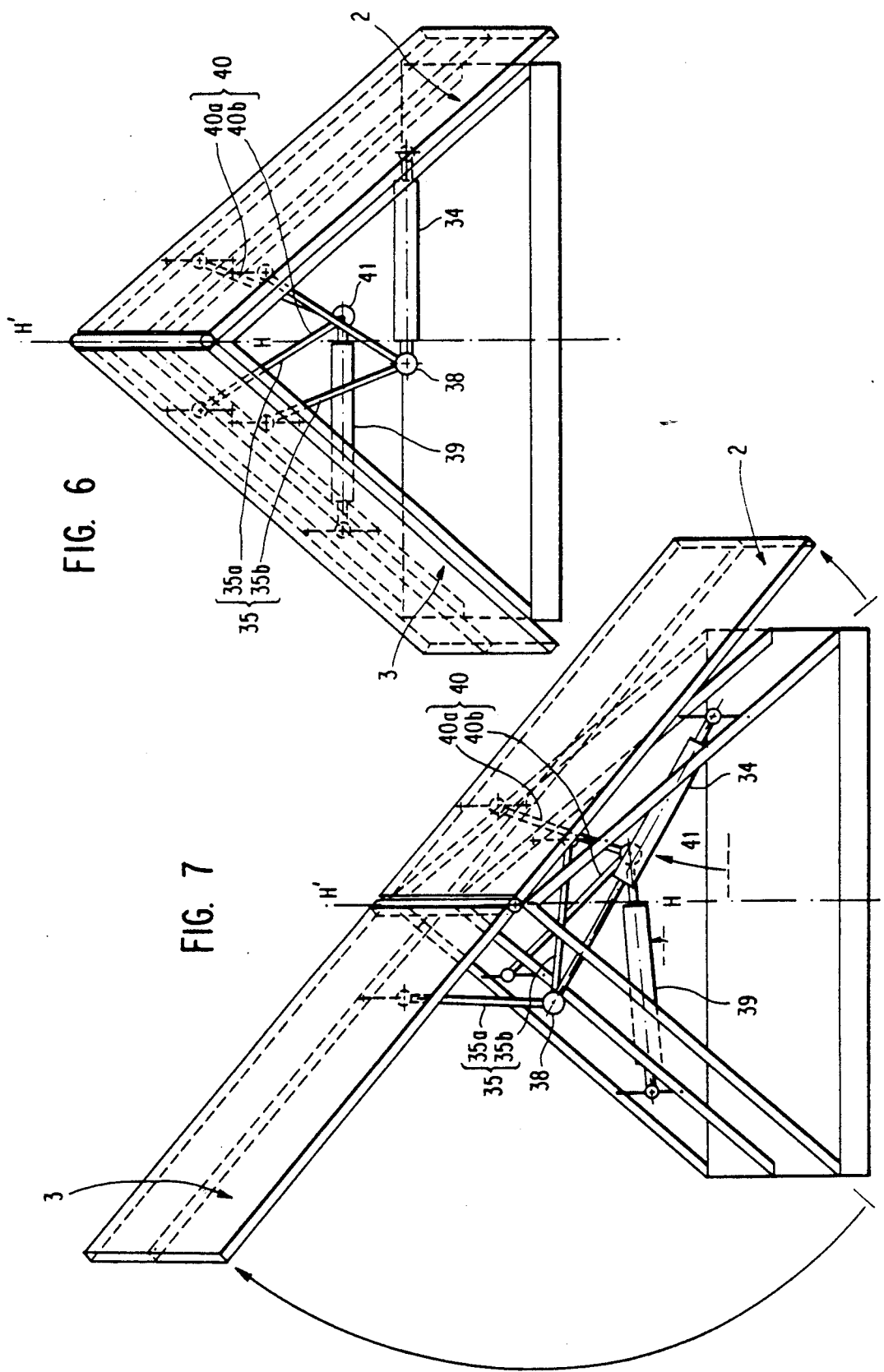

SOLAR COLLECTOR

The improved solar collector of the present invention comprises two plane photovoltaic solar collectors integrated in a tracking device which also allows them to withstand wind well.

BACKGROUND OF THE INVENTION

Solar collector devices, constituted by a generally rectangular structure on which photovoltaic cells are fixed, and maneuvered both in azimuth and in elevation by tracking mechanisms, are already known. Such devices are described, in particular, in patent documents FR-A-2 415 271 and FR-A-2 418 912.

Such solar collectors suffer from several drawbacks. For example, it has been observed that planar automatic-tracking solar collectors installed in zones which are exposed to the wind withstand wind poorly, even when the panels are installed in so-called "safe" positions—the a horizontal position or a vertical position with the panel free to swing flag-like—since these positions do not protect them from turbulent wind.

The solar collector device described in patent document FR-A-2 544 551 is a first attempt to eliminate these drawbacks. This device comprises an assembly constituted by two rectangular horizontally elongated panels, fixed to the front and rear faces of a roof-shaped structure. Only the panel fixed to the front face is used as a solar collector, the other panel fixed to the rear face serving merely to protect the overall device from the wind. This device also includes orientation mechanisms in azimuth keeping the front panel, whose inclination on the other hand remains fixed, facing the sun.

Such a device has the advantage, among many others, of withstanding wind well, but its production of electricity, although being large compared with that of most other tracking solar collectors, is nevertheless limited by virtue of the facts that the device exposes only one of its panels to the sun, and that the panel is not inclinable.

Thus, returning to the design of the device as described in document FR-A-2 554 551, the inventor has set out to improve its production of electricity without losing its other advantages.

The improved solar collector resulting from this research and constituting the subject matter of the present invention has fully achieved its objective, since the advantages of the earlier device are now combined with highly significant other advantages, including an increase in its electricity production by more than double.

This new collector reuses some of the elements of the earlier device: in particular its structure is still roof-shaped and continues to serve as a support for two panels corresponding to its front and rear faces; these panels are still in the form of elongated rectangles; the structure continues to be maneuvered in azimuth by orientation mechanisms which are comparable in design and operation to those of the earlier device and likewise intended to keep its front face in the direction of the sun.

SUMMARY OF THE INVENTION

The improvement brought to this type of device consists in making both front and rear panels, which have hitherto been fixed to the faces of the roof-shaped structure, inclinable, with each of them being independently maneuverable by identical orientation mechanisms, thereby making it possible, if so desired, to limit the solar collector improvement to a single panel which is, in this case, the rear panel.

On its own, the orientatability in elevation given to the rear panel serves to more than double the electricity production of the solar collector, since it transforms a previously fixed panel applied against the rear face of the structure, and whose sole function was to provide protection against the wind, into a second collector panel, maneuvered in elevation in such a manner as its inclination plane remains normal to the rays of the sun.

The orientatability in elevation of the front panel should be seen differently insofar as this panel was already used as a solar collector; it just means that this panel, instead of functioning with a fixed inclination angle corresponding to its low position against the front face of the roof-shaped structure, becomes maneuverable in elevation under the same conditions as the rear panel.

The improvement applied to the functioning of the front panel is by no means negligible, since it serves not only to increase its efficiency to a significant extent, but also to make it possible, for maneuvering in elevation not only one panel but the two of them which, having the same orientation axis and being given the same inclination are consequently aligned in the same plane, to use this single plane solar collector, built up from the two panels and inclinable about their common rotation axis, both forwards, i.e. towards the southern hemisphere and rearwards, i.e. towards the northern hemisphere. The advantage of this maneuver is that it enables a solar collector improved in this way, when installed at latitudes between the tropics, to follow the sun, in spite of its hemisphere changes depending on the seasons, and without having to modify the device basic installation.

Each panel is made orientatable in elevation, both forwards and backwards, by making it independent from the corresponding supporting face of the roof-shaped structure, and by providing it with appropriate mechanisms to enable it to rotate about an axis to which it is hinged, along the ridge line of the structure, and keep an inclination normal to the rays of the sun.

Each orientation mechanism maneuvering in elevation, described as a non-limiting example, comprises in particular:

firstly, a linkage comprising two links having a common hinge at their bottom ends, while their top ends are hinged respectively to the front face of the fixed roof-shaped structure and to the orientatable panel;

Secondly, a hydraulic jack having the base of its cylinder hinged to the front face of the fixed roof-shaped structure, and the end of its rod hinged to the common hinge point between the links.

The hydraulic jack and the links are mounted in a vertical plane in which their hinges allow then to move.

In addition to the above-described main improvement applied to its panels, this new device presents others, which are not negligible, concerning in particular the support of its roof-shaped structure and the motor of its orientation mechanisms in azimuth.

The support makes contact with a running track by means of running and locking mechanisms, whose number has been reduced from four, in the earlier device, to three, in order to improve the stability of the support which, with its three arms reinforced by braces, takes the form of an equilateral triangle.

The motor, which has a pinion engaging a rack fixed on the inside face of the running track, or which operates by friction on this face, has been improved with respect to its disposition, since it is now mounted inside the roof-shaped structure where it is better protected, instead of functioning outside the said structure, as was the case in the prior device.

BRIEF DESCRIPTION OF THE DRAWINGS

The following description, proposed as non-limiting examples, should be read with reference to the accompanying drawings.

FIG. 6 shows the same schematic section of the collector as FIG. 5, but combined with a perspective view for more clearly distinguishing the two vertical planes in which the mechanisms ensuring respectively the maneuver of each panel operate.

FIG. 7 reproduces the view of FIG. 6 but shows both the front and the rear panels maneuvered by their respective mechanisms to take up a common inclination angle about their common axis of rotation, such that both panels are aligned in the same plane, normal to the rays of the sun.

DETAILED DESCRIPTION

Figure 1:
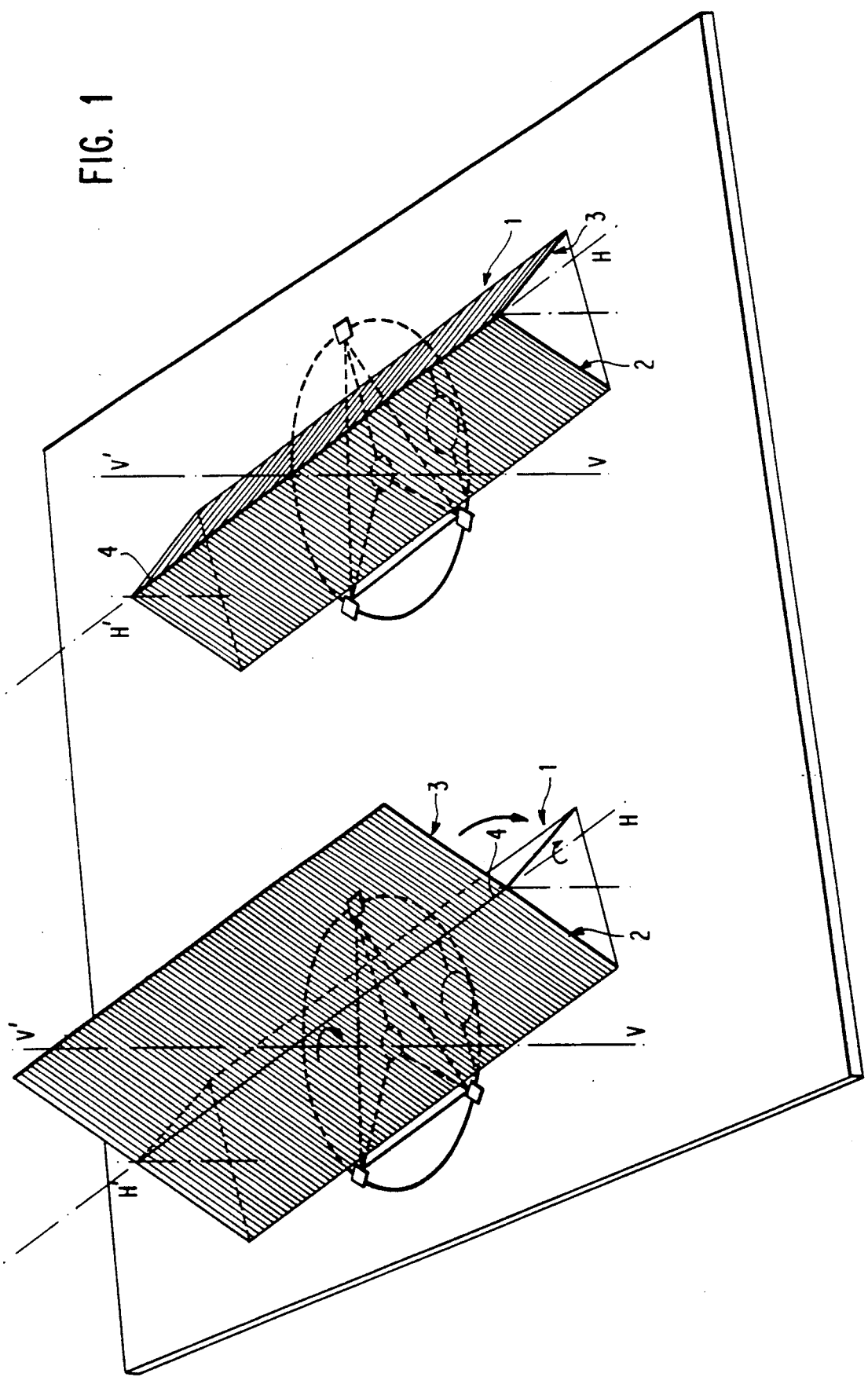
FIG. 1 shows two isometric perspective views of the improved solar collector of the invention; the righthand view shows the collector with its front and rear panels folded down against the roof-shaped structure, whereas the left-hand view shows the rear panel in its raised position.
Figure 4:
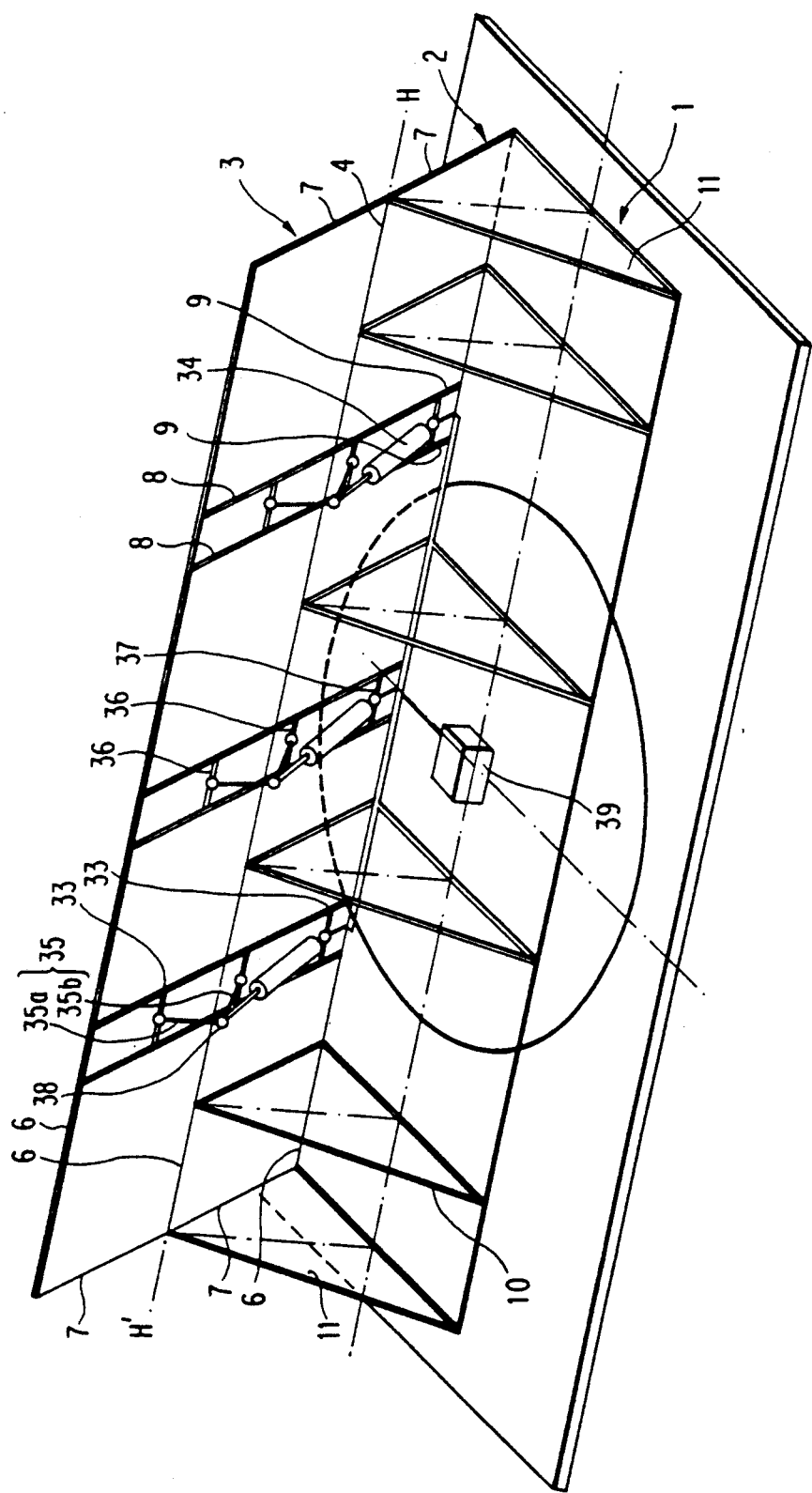
FIG. 4 is a perspective view of the collector seen from behind, and includes schematic representations of a non-limiting example of the orientation mechanisms maneuvering the rear panel in elevation.
Figure 5:
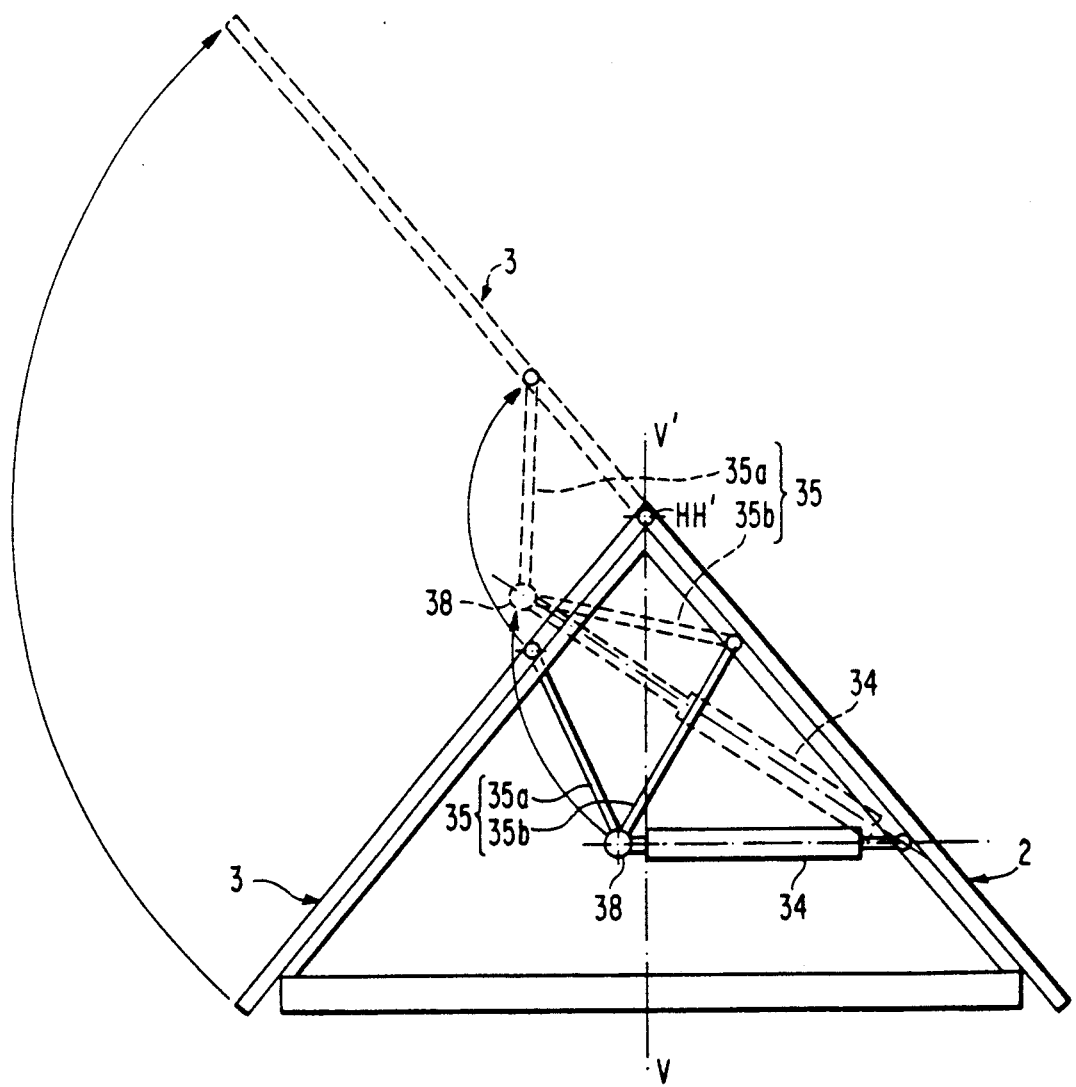
FIG. 5 is a schematic cross section of the solar collector corresponding to the vertical plane V—V' of FIG. 2, with solid lines showing the position of the orientation mechanisms of the rear panel when it is pressed against the rear face of the roof-faced structure, and dashed lines showing the positions taken up by the same mechanisms and the panel after the rotation.

In order to simplify the drawings and since each of the two panels is operated independently of the other by identical mechanisms, the maneuver in elevation of the solar collector has been limited, in FIGS. 1, 4, and 5, to the rear panel (the front panel being considered as fixed), which is not the case for FIGS. 6 and 7 where the maneuver is extended to both panels.

Figure 2:
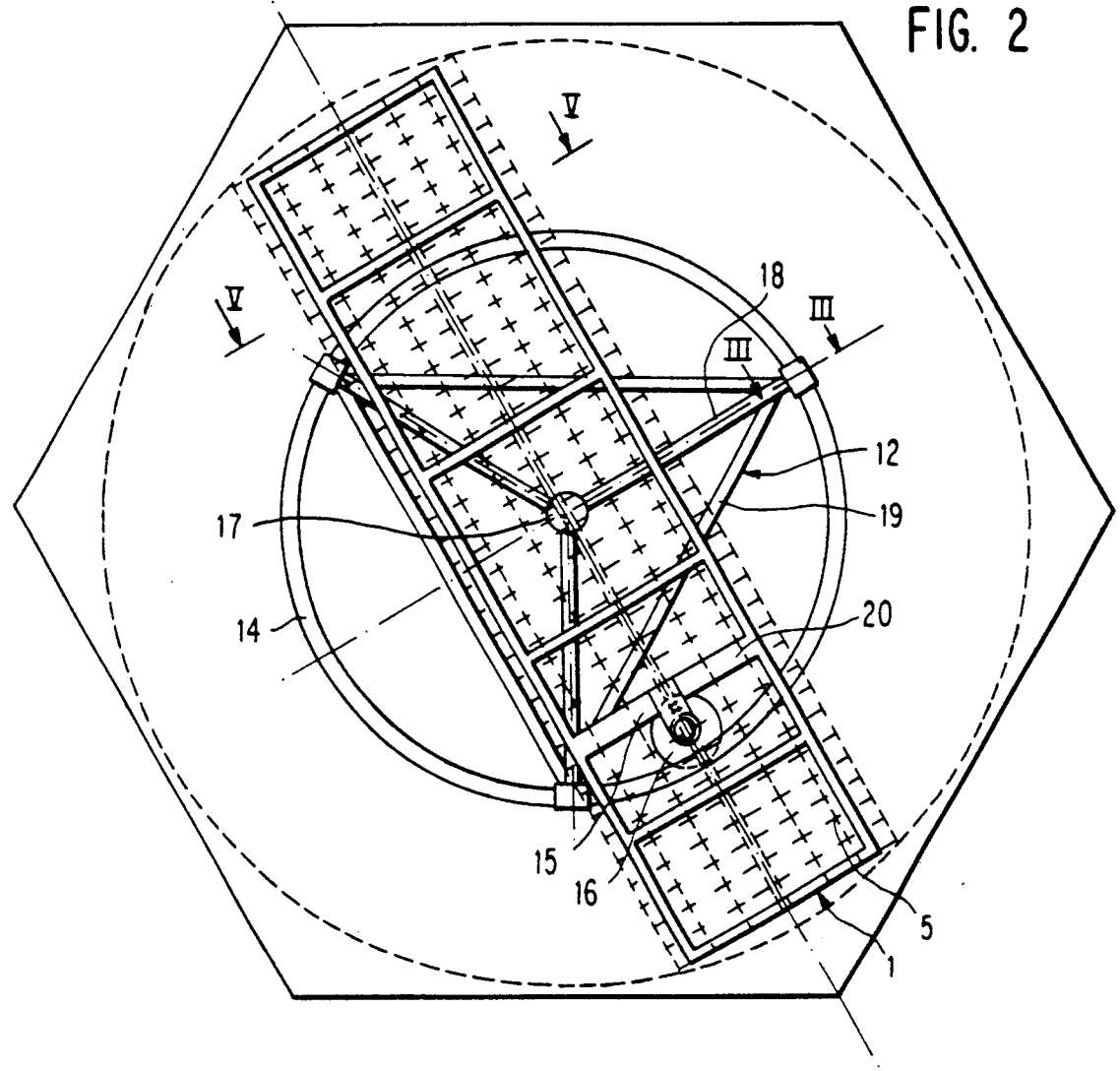
FIG. 2 is a plan view of the solar collector at the level of the roof-shaped structure support; the said structure and the panels fitted with photovoltaic cells, being above this level, are shown in dashed lines.

FIGS. 1, 2, 3, 4—As can be seen, in particular in FIGS. 1, 2, and 4, the improved solar collector of the present invention comprises a roof-shaped structure (1) whose front and rear faces, in the form of an elongated rectangle, serve respectively as supports for a front panel (2) and a rear panel (3) whose longitudinally extending top edges are shown, for illustrative purposes, as coinciding with the ridge line (HH') of the roof-shaped structure (1). The front and rear panels (2, 3) are each constituted by a rectangular frame comprising longitudinally-extending members (6), cross members (7), and intermediate cross members (8, 9). The photovoltaic modules, or other solar collector means, are mounted on these structures.

The roof-shaped structure (1) is cohstituted by a plurality of trusses (10). The trusses situated at each of the ends of the structure (1) by triangular panels (11), are intended to prevent the wind from blowing into the structure (1) and interfering with the proper functioning of the collector. The angle of slope of these trusses depends on the latitude at which the collector is installed, and their bracing is ensured by the frames of the structure (1).

The structure (1) stands on a support (12) which includes a central cylindrical part (17) about the vertical axis of rotation (VV') which serves to center the moving assembly without supporting its weight. The vertical axis (VV') has been made part of the moving assembly in order to enable it to be eventually operated manually, in addition to, or even instead of the automatic operation of the moving assembly.

Three arms (18) extending from the cylindrical part (17) are reinforced at their ends by three braces (19) so that the support is in the form of an equilateral triangle. At each of the vertices of the triangle, constituted by two braces (19) engaging one of the arms (18), a running and locking mechanism as described below is fixed securely. These three mechanisms enable the well-balanced moving assembly to rotate or come to a stop on a circular running track (14). The moving assembly is rotated by a motor (15) which is preferably electrical and which is mounted on one of the intermediate cross members (20) provided between the longitudinal members of the rectangular frame constituting the base of the structure (1). The motor (15) has a wheel (16) engaging the interior face of the running track circular support (14), and this contact may be provided merely by friction, or else by meshing between the wheel—which is then a pinion—and a rack (14') fixed to the running track (14).

Figure 3:
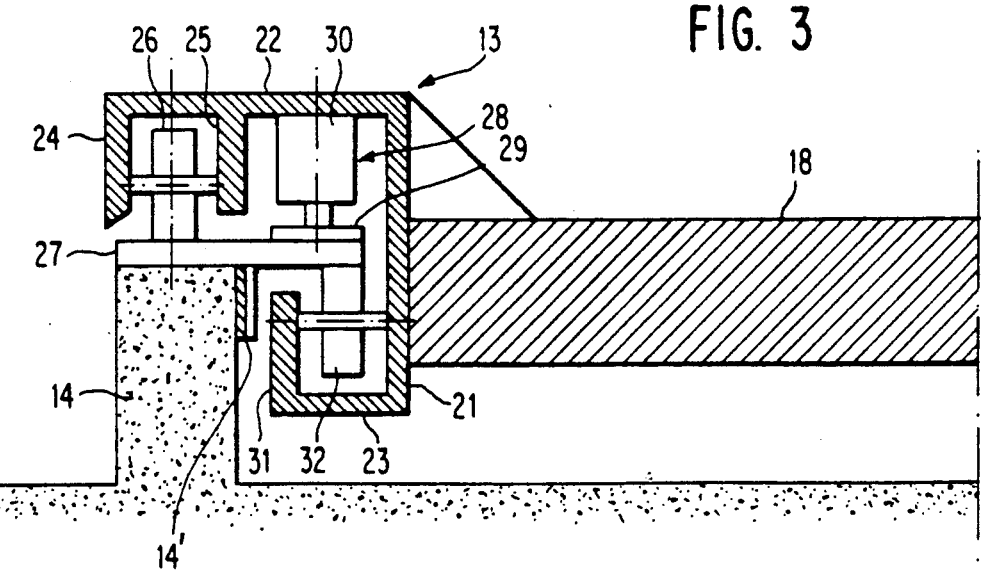
FIG. 3 is a schematic section corresponding to the vertical plane III—III of FIG. 2; it shows one of the running and locking devices belonging to the orientation mechanisms which, maneuvering the roof-shaped structure about its vertical axis of rotation, maintain its front face in the direction of the sun.

A running and locking mechanism (13), as shown in FIG. 3 by way of non-limiting example, comprises a vertical support (21) constituted by a metal plate fixed to the end of one of the arms (18), this plate being connected at its top to a horizontal top plate (22) and at its base to a horizontal bottom plate (23), thereby constituting a U-shaped structure.

The underside of the top plate (22) has two vertical partitions (24, 25) delimiting two U-shaped compartments. The outermost compartment contains a free-running ball-bearing roller (26) whose axle is retained by the partitions (24, 25). This wheel stands on a metal ring (27) overlying the circular running track (14) and projecting inwards from the top of the running track. Over the overhanging portion of the ring (27), the other compartment contains a brake mechanism (28) comprising a brake shoe (29) and an electromechanical device (30) for actuating.

The bottom plate (23) includes a vertical partition (31) disposed in a such a manner as to form, together with the vertical support (21) and the bottom plate (23), a third U-shaped compartment containing another free-running ball-bearing roller (32) whose axle is held by the vertical support (21) and the vertical partition (31). This wheel makes contact with the underside of the overhanging portion of the metal ring (27). While the roller (26) supports the weight of the moving assembly, the roller (32) opposes the moving assembly being raised, and also exerts the required counterforce to enable the brake shoe (29) to apply pressure.

Whenever the motor (15) is switched on, the brake shoe (29) is automatically disengaged from the ring (27), thereby leaving the moving assembly free to rotate. Conversely, whenever the motor (15) is switched off, the brake shoe (29) comes into action automatically and locks against the ring (27).

This automatic locking also takes place whenever the wind blows too hard, as detected by an appropriate apparatus connected to the device for actuating the brake shoe (29), or whenever the wind becomes turbulent, since it might interfere, if the motor went on running, with the rotation of the moving assembly.

In theory, the motor (15), which is preferably under the control of a microprocessor, operates discontinuously throughout the day in order to rotate the moving assembly from east to west, and rotates continuously at the end of the day in order to bring the assembly back from its west facing position to its morning position facing the sun. This theoretical way of operating the motor (15) may be modified under certain circumstances.

Thus, for example, when in the tropical zones the sun has passed from the southern hemisphere to the northern hemisphere, its rays are collected by the rear panel (3) inclined towards the northern hemisphere, and extended by the front panel (2) if this panel has been made inclinable too. Insofar as the sun moves from east to west across the northern hemisphere, the roof-shaped structure (1), whose front face was initially facing west, rotates from west to east in the direction opposite to that described above applicable to when the sun moves across the southern hemisphere, thereby causing the motor to operate during the day discontinuously from west to east, and at the end of the day continuously from east to west.

FIG. 4—In the present non-limiting example, the orientation mechanisms, as shown in this figure, are limited to those maneuvering the elevation of the rear panel (3) in order to avoid overcrowding the drawing; they comprise three identical assemblies (33), mounted inside the roof-shaped structure (1) and distributed along its length, with one of the assemblies being situated in the middle of the said structure (1) and with the other two being disposed symmetrically about the middle assembly.

Each assembly (33) is constituted by a hydraulic jack (34) and a linkage (35) comprising two links (35a, 35b), substantially of the same length and hinged to each other at one end, while their opposite ends are respectively hinged, the link 35b to the fixed front face of the structure (1) and the link 35a to the panel (3) maneuverable about its horizontal axis of rotation (HH'). In both cases, the hinges are mounted on spacers (36) provided between the intermediate cross members (9) of the structure (1) front face. The cylinder of each hydraulic jack (34) is securely hinged, at its base, to the fixed structure (1) front face, the hinge being mounted on a spacer (37) provided between intermediate cross members (9), while the end of its rod is hinged to the common hinge point between the links (35a, 35b). The three hydraulic jacks (34) are connected to a hydraulic control center (39) which is provided inside the structure (1) over its base.

FIG. 5—In solid lines, this figure shows the rear panel (3), now maneuverable in elevation, in its "safe" position against the structure (1) rear face; solid lines are likewise used for showing the corresponding positions of the orientation mechanisms i.e. the hydraulic jack (34), the links (35a, 35b), and their common hinge point (38). When the rods of the three hydraulic jacks are deployed, they apply thrust to the rear panel (3), thereby causing it to rotate about the axis (HH') coinciding with the structure (1) ridge line up to a new position, shown in dashed lines, enabling it to operate as a solar collector. Similarly, dashed lines are used for showing the corresponding positions taken up by the hydraulic jack (34), the links (35a, 35b), and the common hinge point (38).

FIG. 6—This figure is a section through the solar collector, as shown in FIG. 5, but combined with an isometric perspective view in order to enable to distinguish more clearly from each other the two vertical planes in which the mechanisms specific to each of the front and rear panels (2,3) are free to move. These panels are shown in their low or "safe" positions against their structure (1) corresponding faces; their respective mechanisms are mounted facing one another and, in order to allow them to operate without interference, the vertical planes in which they operate are slightly offset from each other.

The mechanisms for maneuvering in elevation the rear panel (3) being identical to those shown in FIG. 5 keep, in this figure, their FIG. 5 notations, whereas those given to the front panel (2) mechanisms are: hydraulic jack (39), links (40a, 40b), hinge point common to both links and hyhydraulic jack rod (41).

The parts constituting these mechanisms are shown in FIG. 6 in positions corresponding to the above-described positions of the front and rear panels (2,3).

FIG. 7—In this figure the front and rear panels (2, 3), maneuvered by their respective mechanisms about their common horizontal axis of rotation (HH') until they have the same inclination angle, are aligned in the same plane. As can be seen in the figure, this plane may be moved about its rotation axis and take up any inclination between the folded-down position of the front panel (2) and the folded-down position of the rear panel (3), which are also the positions taken up by these panels automatically when the strength of the wind endangers the safety of the solar collector.

The FIG. 6 references are retained in FIG. 7 for the new positions taken up by the panels and the parts of their orientation mechanism.

It is emphasized that the mechanisms for maneuvering the front and rear panels (2, 3), as described above, are given purely by way of examples, and that the two panels could equally well be maneuvered by other types of mechanisms. An example of such mechanisms is proposed in FIG. 8.

Figure 8:
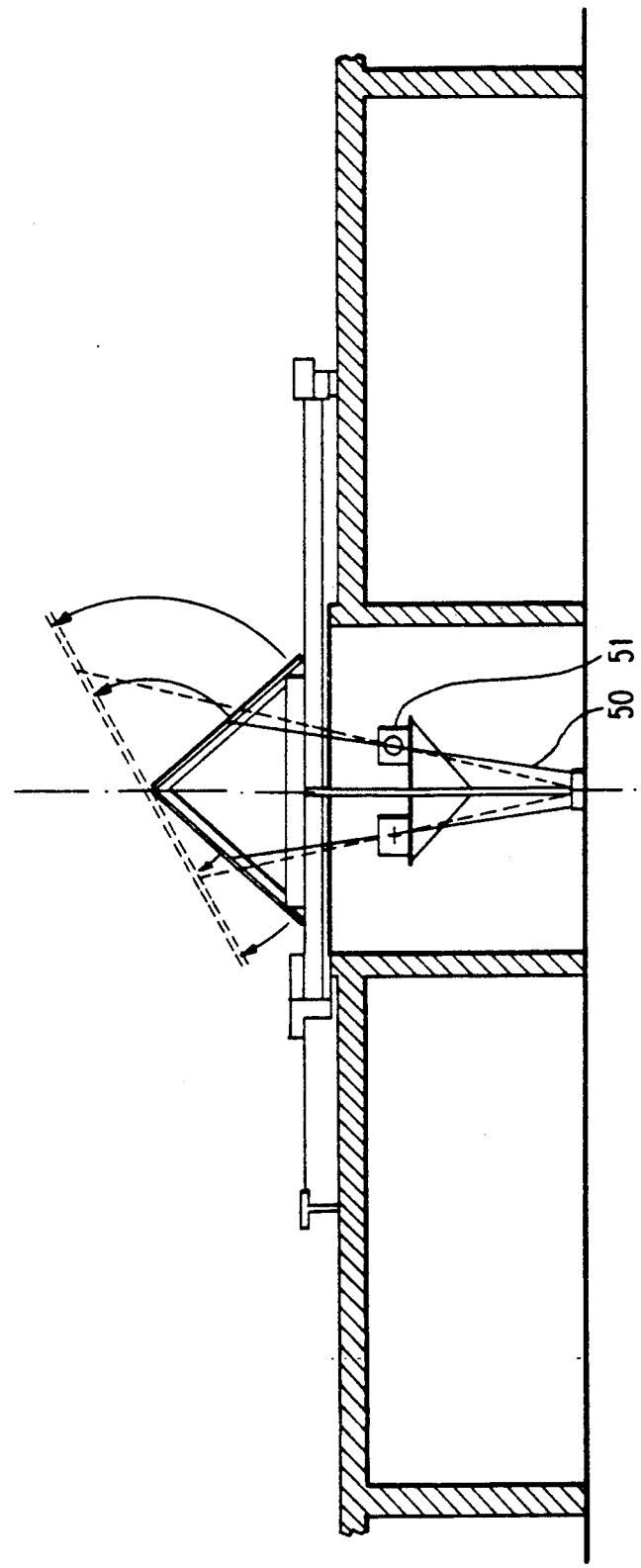
FIG. 8 is a section through a building fitted with a solar collector of the invention, with a different example of mechanisms for maneuvering the panels in elevation.

FIG. 8—It represents a different system for maneuvering in elevation the front and rear panels (2, 3); in this system the front panel (2) and the rear panel (3) are respectively driven up and down by two independent and identical mechanisms, each of them comprising a threaded rod (50), hinged to the panel by means of a horizontally extending triangular device, the threaded rod being activated by a small electric motor (51), mounted inside the roof-shaped structure (1) and on its vertical axis of rotation.

Concerning the roof-shaped structure (1), it is always possible and sometimes useful to modify some of its features.

As an example—not shown in the above-described figures—it may be advantageous to replace the ridge line along the top of the roof-shaped structure (1), which coincides with the rotation axis (HH') common to the front and rear panels (2, 3), by a solid or open flat of the same length, requiring the horizontal axis of rotation (HH') to be split into two parallel axes, respectively used by the front panel (2) and the rear panel (3).

In this example, when the front and rear panels (2, 3), maneuvered by their respective mechanisms, take up the same inclination angle, they are in parallel planes, only aligned when they are horizontal.

I claim:

1. Solar collector device comprising: a roof-shaped structure (1) having elongated rectangular front and rear faces and a horizontal ridge line (HH'), said front and rear faces respectively providing support for a front panel (2) and a rear panel (3) having approximately the same dimensions as the structure (1) faces and arranged such that top longitudinal edges of said front panel and rear panel coincide with said horizontal ridge line (HH'); said front panel (2) having photovoltaic cells mounted thereon for providing a plane solar collector having a fixed inclination angle corresponding to a slope angle of the structure (1) front face;

a means for moving said roof-shaped structure (1) about a central vertical axis of rotation (VV'); a tracking mechanism for maintaining said front panel (2) facing the sun;

wherein said structure (1) further comprises a second solar collector constituted by said rear panel (3) having photovoltaic cells mounted thereon providing the same collecting surface as the solar collector mounted on the front panel (2), said rear panel (3) being independent from its supporting structure (1) rear face, and rotatable about a horizontal rotation axis coinciding with the structure (1) ridge line (HH') to which said top longitudinal edge is hinged; and orientation means operating in elevation for inclining and maintaining said rear panel (3) normal to the sun.

2. Solar collector, according to claim 1, whose front panel (2) is also orientatable in elevation under identical conditions to its rear panel (3).

3. Solar collector, according to claim 2, including, to insure the orientatability in elevation of its front and rear panels (2, 3), independent and identical mechanisms comprising a hydraulic jack (34) whose cylinder is hinged, at its base, to the face of the structure (1) opposite to the panel to be maneuvered, and the end of its rod (38) to a linkage (35) made of two links (35a, 35b), whose opposite ends are hinged respectively to the panel to be maneuvered and to the same face of the structure (1) as that to which the hydraulic jack (34) is hinged.

4. Solar collector, according to claim 2, whose front and rear panels (2, 3) may be orientated in elevation by a mechanism comprising a threaded rod (50), hinged to the panel by means of an appropriate device, and activated by a small electric motor (51).

5. Solar collector, according to any one of claims 2, 3 or 4, whose front and rear panels (2, 3) can be maneuvered in elevation by combined action of their respective mechanisms (34, 39) in such a manner as to enable both of them to be aligned in the same plane, the said plane then being inclinable about its horizontal axis of rotation (HH'), both forwards and backwards, without having to modify the basic installation of the solar collector device.

* * * * *